(12) United States Patent
Hong et al.

(10) Patent No.: US 11,660,702 B2
(45) Date of Patent: May 30, 2023

(54) LASER APPARATUS INCLUDING FASTENING HOLES AND INLET GROOVES

(71) Applicant: SAMSUNG DISPLAY CO., LTD., Yongin-si (KR)

(72) Inventors: Kyongho Hong, Hwaseong-si (KR); Dokyun Kwon, Seoul (KR); Seokjoo Lee, Hwaseong-si (KR); Jeongho Yi, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 930 days.

(21) Appl. No.: 16/249,533

(22) Filed: Jan. 16, 2019

(65) Prior Publication Data

US 2019/0217414 A1   Jul. 18, 2019

(30) Foreign Application Priority Data

Jan. 17, 2018   (KR) .................... 10-2018-0005915

(51) Int. Cl.
*B23K 26/142* (2014.01)
*B08B 5/04* (2006.01)
*B08B 15/04* (2006.01)

(52) U.S. Cl.
CPC .............. *B23K 26/142* (2015.10); *B08B 5/04* (2013.01); *B08B 15/04* (2013.01)

(58) Field of Classification Search
CPC ...... B23K 26/142; B23K 26/38; B23K 26/16; B08B 5/04

See application file for complete search history.

(56) References Cited

U.S. PATENT DOCUMENTS

| 4,698,480 | A | * | 10/1987 | Klingel | .............. | B23Q 3/15573 219/121.84 |
| 4,851,061 | A | * | 7/1989 | Sorkoram | ............ | B23K 26/702 219/121.72 |
| 5,254,834 | A | * | 10/1993 | Johnson | ................ | B23K 26/53 219/121.72 |
| 5,932,013 | A | * | 8/1999 | Salli | .......................... | B08B 5/04 15/300.1 |

(Continued)

FOREIGN PATENT DOCUMENTS

| JP | 2010142891 A | * | 7/2010 | ........... | C03B 33/076 |
| KR | 20090030823 A | * | 3/2009 | | |

(Continued)

OTHER PUBLICATIONS

Satyendra, Pipe Fittings, Aug. 20, 2015, IspatGuru, https://www.ispatguru.com/pipe-fittings/ (Year: 2015).*

*Primary Examiner* — John J Norton
*Assistant Examiner* — Franklin Jefferson Wang
(74) *Attorney, Agent, or Firm* — F. Chau & Associates, LLC

(57) ABSTRACT

A laser apparatus including a stage. A target substrate is mounted on the stage. The laser apparatus further includes a coupling unit disposed below the stage and coupled with a conveying unit, the conveying unit conveying the stage. The laser apparatus additionally includes a discharge unit disposed at a predetermined position for laser machining, configured to communicate with the coupling unit when docked with the coupling unit, and configured to discharge foreign matter that is generated during laser machining.

21 Claims, 7 Drawing Sheets

(56) References Cited

U.S. PATENT DOCUMENTS

| | | | | |
|---|---|---|---|---|
| 6,309,204 B1* | 10/2001 | Atobe | ................ | B23K 26/0823 |
| | | | | 264/161 |
| 8,466,388 B2 | 6/2013 | Zeygerman | | |
| 2004/0140300 A1* | 7/2004 | Yoshikawa | .......... | B23K 26/142 |
| | | | | 219/121.84 |
| 2007/0164073 A1* | 7/2007 | Watanabe | ............ | B28D 5/0011 |
| | | | | 225/96.5 |
| 2009/0120918 A1* | 5/2009 | Kwak | ............... | H01L 21/67333 |
| | | | | 219/121.85 |
| 2009/0223944 A1* | 9/2009 | Sukhman | ................ | B08B 15/04 |
| | | | | 219/121.84 |
| 2013/0087547 A1* | 4/2013 | Hunter | ................ | B23K 26/142 |
| | | | | 219/438 |
| 2013/0199575 A1* | 8/2013 | Koeck | ..................... | B08B 15/04 |
| | | | | 15/300.1 |
| 2015/0352666 A1* | 12/2015 | Fujita | .................. | B23K 26/402 |
| | | | | 219/121.61 |
| 2018/0071865 A1* | 3/2018 | Chen | ..................... | B23K 26/16 |
| 2018/0304408 A1* | 10/2018 | Matsumura | ......... | H01L 21/6838 |
| 2018/0345416 A1* | 12/2018 | Zhu | ..................... | B23K 26/147 |

FOREIGN PATENT DOCUMENTS

| | | |
|---|---|---|
| KR | 10-1381891 | 4/2014 |
| KR | 10-1485062 | 1/2015 |
| KR | 10-1628326 | 6/2016 |
| KR | 10-2017-0052168 | 5/2017 |
| KR | 20180002421 A * | 1/2018 |

* cited by examiner

LASER APPARATUS INCLUDING FASTENING HOLES AND INLET GROOVES

CROSS-REFERENCE TO RELATED APPLICATION

This application claims priority under 35 U.S.C, § 119 to Korean Patent Application No. 10-2018-0005915, filed on Jan. 17, 2018, in the Korean Intellectual Property Office (KIPS), the disclosure of which is incorporated by reference herein in its entirety.

1. TECHNICAL FIELD

Exemplary embodiments of the present invention relate to a laser apparatus, and more particularly, to a laser apparatus including fastening holes and inlet grooves.

2. DISCUSSION OF THE RELATED ART

Laser apparatuses may irradiate a target object with a laser beam emitted from a laser light source to perform processing operations such as marking, exposure, etching, punching, scribing, dicing, or the like with the laser beam. When a dicing process is performed, for example, when cutting an object, foreign matter such as fumes may be generated from the object as a result of the dicing process.

The foreign matter such as the fumes may be discharged to the outside by a discharge unit connected to the laser apparatus.

The conventional discharge unit is a bundle of pipes which includes a plurality of pipes each having a diameter of about 8 mm or less. Since the diameter of the pipe is relatively small, fumes may be deposited inside the pipes, and the pipes may often become clogged.

SUMMARY

According to an exemplary embodiment of the present invention, a laser apparatus including a stage. A target substrate is mounted on the stage. The laser apparatus further includes a coupling unit disposed below the stage and coupled with a conveying unit, the conveying unit conveying the stage. The laser apparatus additionally includes a discharge unit disposed at a predetermined position for laser machining, configured to communicate with the coupling unit when docked with the coupling unit, and configured to discharge foreign matter that is generated during laser machining.

In an exemplary embodiment of the present invention, the discharge unit includes a casing which is substantially hollow to allow the foreign matter to pass therethrough, a suction portion disposed on the casing, and a connection pipe connected to a dust collection pipe at one side of the casing.

In an exemplary embodiment of the present invention, the casing includes a first horizontal casing connected to one side of a guide. The coupling unit is configured to move along the guide. The casing further includes a second horizontal casing connected to the connection pipe, and an inclined casing connecting the first horizontal casing and the second horizontal casing, the inclined casing having a predetermined inclination.

In an exemplary embodiment of the present invention, the suction portion includes a ring portion disposed on the casing and configured to be docked with a lower portion of the coupling unit, and a flange disposed on the ring portion and protruding past an outer circumference of the ring portion.

In an exemplary embodiment of the present invention, the flange includes a flexible material.

In an exemplary embodiment of the present invention, the flange has a flat shape when it is not docked with the coupling unit, and has an arc shape when it is docked with the coupling unit.

In an exemplary embodiment of the present invention, the stage includes a central support overlapping a portion of a substrate lying area. The target substrate is mounted on the substrate lying area. The stage further includes a cutting line groove disposed outside of the central support and having a shape corresponding to that of a laser cutting line, and a plurality of inlet grooves disposed outside the cutting line groove.

In an exemplary embodiment of the present invention, a plurality of fastening holes is disposed in the central support, and each of the fastening holes overlap the substrate lying area.

In an exemplary embodiment of the present invention, the stage further includes a stage base coupled to the conveying unit and disposed on the coupling unit.

In an exemplary embodiment of the present invention, the stage further includes a vacuum portion configured to provide suction through each of the fastening holes.

In an exemplary embodiment of the present invention, the cutting line groove and each of the inlet grooves are configured to receive, during the laser machining, the foreign matter and to move the foreign matter to the coupling unit.

In an exemplary embodiment of the present invention, the coupling unit includes a coupling portion having a shape corresponding to a shape of the suction portion, and an inclined portion extending from the coupling portion. Inclined sidewalls of the inclined portion extend away from each other in an upward direction. The coupling unit further includes a side flange protruding from an end portion of the inclined portion in a direction orthogonal to a direction in which the stage is conveyed.

In an exemplary embodiment of the present invention, a diameter of each of the coupling portion and the suction portion is about 100 mm or more.

According to an exemplary embodiment of the present invention, a laser apparatus includes a stage. A target substrate is mounted on the stage and is configured to receive a laser beam emitted from a laser generator. The laser apparatus further includes a coupling unit disposed below the stage and configured to remove foreign matter, and a discharge unit disposed at a predetermined position for laser machining and configured to communicate with the coupling unit through docking with the coupling unit to discharge the foreign matter.

In an exemplary embodiment of the present invention, the discharge unit includes a casing which is substantially hollow, a suction portion disposed on the casing, and a connection pipe connected to a dust collection pipe at one side of the casing.

In an exemplary embodiment of the present invention, the coupling unit includes a coupling portion having a shape corresponding to a shape of the suction portion, and an inclined portion connected to the coupling portion.

In an exemplary embodiment of the present invention, the inclined portion includes an air supply pipe configured to supply air and a nozzle connected to the air supply pipe to spray air.

In an exemplary embodiment of the present invention, the nozzle is inclined at an angle corresponding to the normal to the inclined portion.

In an exemplary embodiment of the present invention, the air supply pipe is configured to rotate.

In an exemplary embodiment of the present invention, a diameter of each of the coupling portion and the suction portion is about 100 mm or more.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawing, wherein.

DETAILED DESCRIPTION OF THE EMBODIMENTS

Figure 1A:
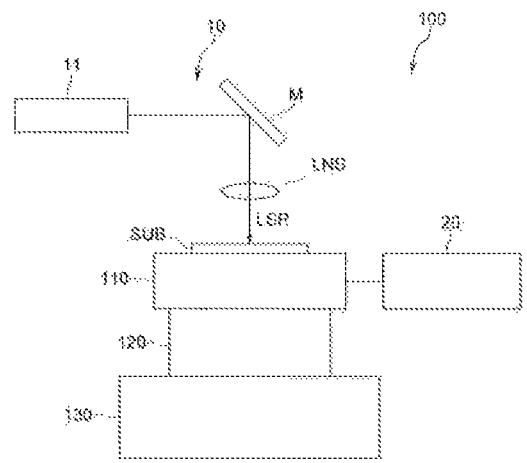
FIG. 1A is a diagram schematically illustrating a laser apparatus according to an exemplary embodiment of the present invention.

Exemplary embodiments of the present invention will now be described more fully hereinafter with reference to the accompanying drawings. It is to be understood that the present invention may, however, be embodied in different forms and thus should not be construed as being limited to the exemplary embodiments set forth herein. Like reference numerals may refer to like elements throughout the specification.

Hereinafter, exemplary embodiments of the present invention will be described in detail with reference to the accompanying drawings.

Figure 1B:
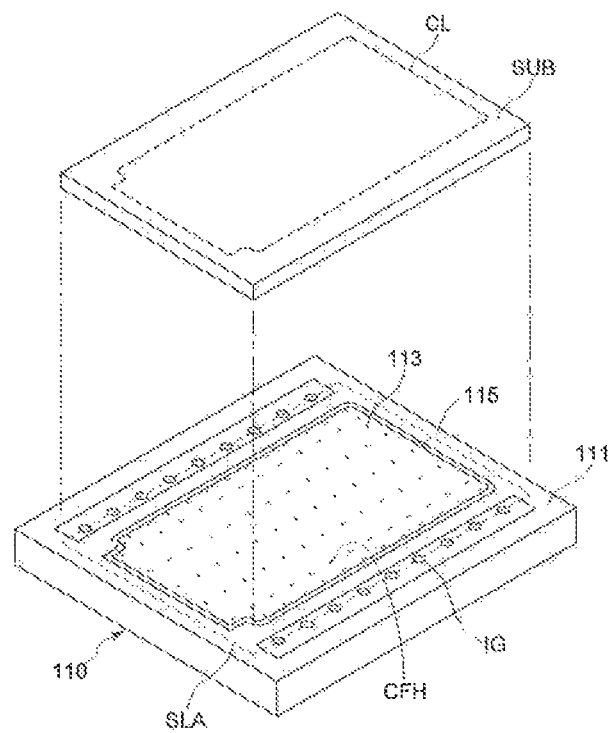
FIG. 1B is a perspective view illustrating a part of the laser apparatus illustrated in FIG. 1 according to an exemplary embodiment of the present invention.
Figure 2:
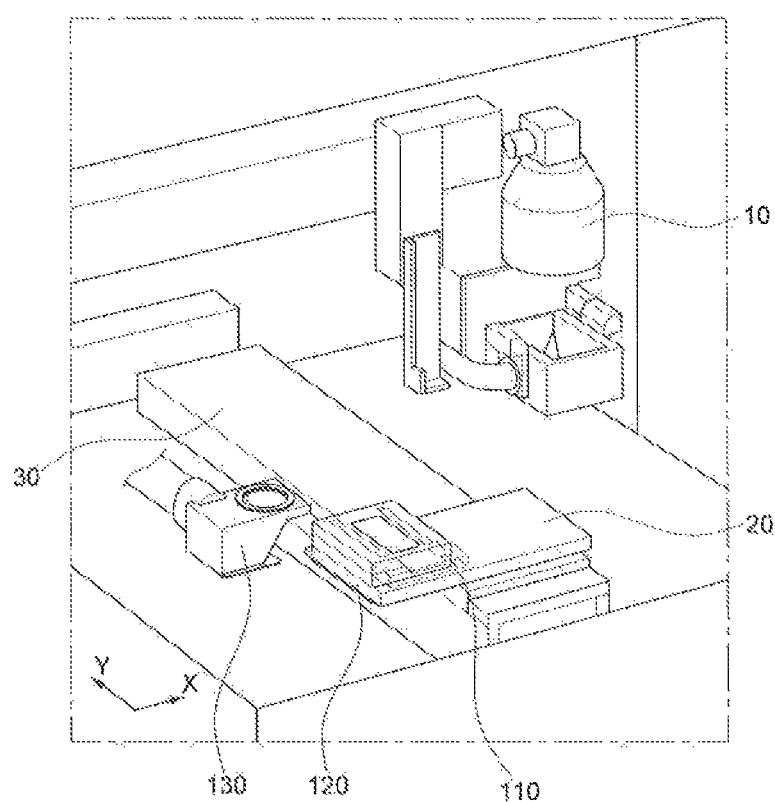
FIG. 2 is a perspective view illustrating a laser apparatus according to an exemplary embodiment of the present invention.
Figure 4A:
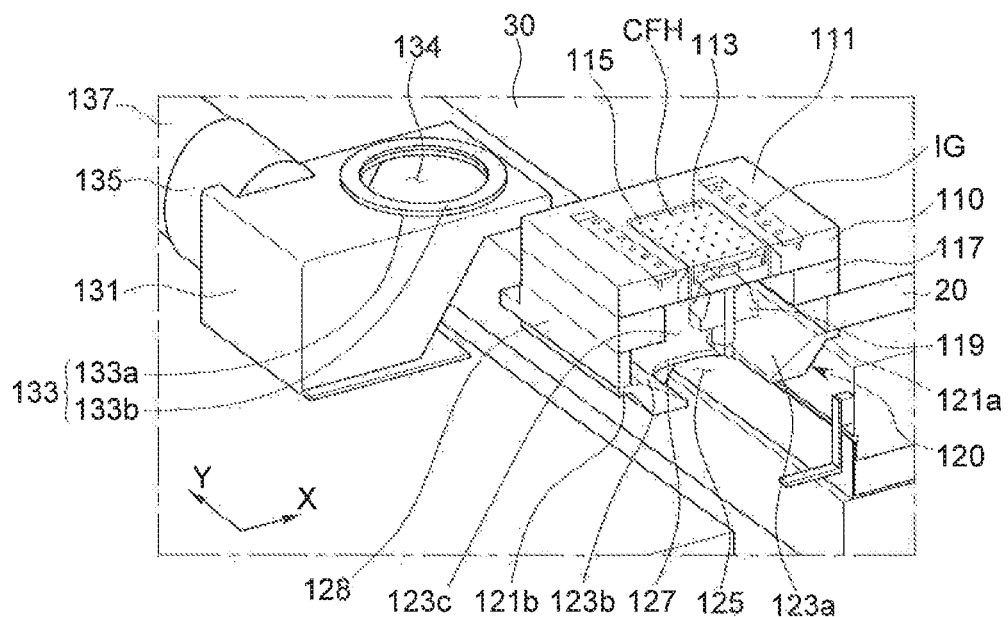
FIG. 4A is a partial cross-sectional view illustrating a state before docking of a laser apparatus according to an exemplary embodiment of the present invention.

FIG. 1A is a diagram schematically illustrating a laser apparatus according to an exemplary embodiment of the present invention, FIG. 1B is a perspective view illustrating a part of the laser apparatus illustrated in FIG. 1 according to an exemplary embodiment of the present invention, FIG. 2 is a perspective view illustrating a laser apparatus according to an exemplary embodiment of the present invention, and FIG. 4A is a partial cross-sectional view illustrating a state before docking of a laser apparatus according to an exemplary embodiment of the present invention.

For convenience of explanation, a coupling unit 120 and a discharge unit 130 disposed below a stage 110 may be omitted in FIG. 1B.

As used herein, a y-axis direction is a direction in which the stage moves by a conveying unit 20, and an x-axis direction is a direction which is orthogonal, on a plane, to the direction in which the stage moves.

The coupling unit 120 and the discharge unit 130 will be described below with reference to FIGS. 2 to 4B.

The laser apparatus 100 according to an exemplary embodiment of the present invention may be used in a marking process or a cutting process. For example, the laser apparatus 100 according to an exemplary embodiment of the present invention may irradiate a target substrate SUB with a laser beam LSR to form a cutting line CL or a guide line, or the laser apparatus 100 may cut the target substrate SUB. In an exemplary embodiment of the present invention, the laser apparatus 100 used in the cutting process is illustrated in the accompanying drawings by way of example. However, the laser apparatus according to an exemplary embodiment of the present invention is not limited to a specific process, and may perform various processes according to the type and usage of the process material.

Referring to FIGS. 1A and 2, a laser apparatus 100 according to an exemplary embodiment of the present invention includes a stage 110, a coupling unit 120, and a discharge unit 130.

The stage 110 is provided such that the target substrate SUB to be irradiated with a laser beam may be mounted on the stage 110.

The laser beam is generated by a laser generating unit 10. For example, a laser generator 11 may generate an excimer laser or a solid laser.

The target substrate SUB is mounted on the stage 110. An area on the stage 110 on which the target substrate SUB is to be placed may be a substrate lying area. The laser beam LSR generated in the laser generator 11 may be emitted onto the target substrate SUB mounted on the stage 110. As the laser beam LSR is emitted along a cutting line CL of the target substrate SUB, the target substrate SUB may be cut, and a peripheral region of the target substrate SUB may be removed.

The laser generating unit 10 may further include at least one direction changing member M and an optical system LNS.

The direction changing member M is disposed between the laser generator 11 and the stage 110. The direction changing member M may be made of a reflective material. For example, the direction changing member M may be a mirror or the like. The direction changing member M may serve to change a propagation direction of the laser beam LSR so that the laser beam LSR provided from the laser generator 11 is directed toward the stage 110.

The optical system LNS may change the shape and size of the laser beam LSR incident thereto. In addition, the optical system LNS may change the focus of the laser beam LSR incident thereto. For example, the optical system LNS may include at least one lens.

The coupling unit 120 is disposed below the stage 110 and is coupled to the conveying unit 20.

The discharge unit 130 is disposed at a predetermined position for laser machining, and communicates with the coupling unit 120 when docked with the coupling unit 120 to discharge foreign matter, including fume, which may be generated in the laser machining.

Firstly, referring to FIG. 1B, the stage 110 according to an exemplary embodiment of the present invention has a quadrangular shape. However, exemplary embodiments of the present invention are not particularly limited to the shape of the stage 110. The stage 110 includes a peripheral support 111 and a central support 113.

The peripheral support 111 has a frame shape that at least partially surrounds the central support 113. The central support 113 supports the target substrate SUB. For example, the target substrate SUB is disposed on the central support 113.

The substrate lying area SLA overlaps, on a plane, the entire portion of the central support 113 and overlaps, on a plane, at least a part of an inner side area of the peripheral support 111. An edge area of the peripheral support 111 does not overlap the substrate lying area SLA. For example, edges of the peripheral support 111 may surround the substrate lying area SLA.

According to an exemplary embodiment of the present invention, an upper surface of the peripheral support 111 and an upper surface of the central support 113 are disposed on a substantially same planar surface.

The peripheral support 111 and the central support 113 are spaced apart from each other. A space between the peripheral support 111 and the central support 113 is a cutting line groove 115. For example, the cutting line groove 115 may surround the central support 113 to correspond to the cutting line CL.

The cutting line groove 115 has a shape corresponding to the cutting line CL of the target substrate SUB to be irradiated with the laser beam emitted from the laser generating unit 10 during laser machining.

In an exemplary embodiment of the present invention, although the cutting line CL and the cutting line groove 115 are depicted as having a shape similar to that of a bottle (e.g., a rectangular shape with a first side larger than a second side opposite thereto), the cutting line CL and the cutting line groove 115 may have a quadrangular shape (e.g., a rectangular shape), and the shape of the cutting line CL and the cutting line groove 115 is not limited thereto.

The cutting line groove 115 may have a predetermined width such that foreign matter, including fume, which may be generated during laser machining, may be removed along the cutting line groove 115 and discharged to the outside through the coupling unit 120 and the discharge unit 130.

In an exemplary embodiment of the present invention, the peripheral support 111 and the central support 113 may have a shape connected by at least one connecting portion. In an exemplary embodiment of the present invention, the cutting line groove 115 may have a frame shape in which an end portion is not connected.

In addition, in exemplary embodiment of the present invention, a plurality of connecting portions may be provided. The connecting portions may be spaced apart from each other to connect the peripheral support 111 and the central support 113. In an exemplary embodiment of the present invention, a plurality of cutting line grooves 115 may be provided between the peripheral support 111 and the central support 113.

According to an exemplary embodiment of the present invention, at least one inlet groove IG may be disposed in an area on the peripheral support 111 that is adjacent to the cutting line groove 115 on the stage 110. The inlet grooves IG are arranged to be spaced apart from each other in a line on two sides of the central support 113 that are opposite to each other. However, the present invention is not limited thereto. For example, the inlet grooves IG may surround all sides of the cutting line groove 115.

The inlet grooves IG may be connected to the cutting line groove 115 and the inlet grooves IG may be connected to the coupling unit 120. For example, the inlet grooves IG may be directly connected to the coupling unit 120.

Each of the inlet grooves IG may partially overlap the substrate lying area SLA on a plane. For example, on a plane, an inner side area of each of the inlet grooves IG overlaps the substrate lying area SLA, and an outer side area of each of the inlet grooves IG does not overlap the substrate lying area SLA; however, the present invention is not limited thereto. Accordingly, when the target substrate SUB is mounted on the stage 110, each of the outer side areas of the inlet grooves IG may be exposed by the target substrate SUB.

According to an exemplary embodiment of the present invention, since each outer side area of the inlet grooves IG is exposed by the target substrate SUB, external air may be directed to the coupling unit 120 and the discharge unit 130 through each inlet groove IG by a suction force applied from the coupling unit 120 and the discharge unit 130. Accordingly, when the target substrate SUB is cut by the laser beam LSR, generated foreign matter and debris may be introduced into the inlet groove IG by the flow of the air.

Accordingly, foreign matter and debris generated on upper and lower portions of the target substrate SUB as the target substrate SUB is cut may be removed.

The stage 110 may further include a plurality of central fastening holes CFH. The number of central fastening holes CFH is not particularly limited in the present invention.

The central fastening holes CFH may be arranged in a matrix form on the stage 110. However, the arrangement of the central fastening holes CFH is not particularly limited in the present invention. Each of the central fastening holes CFH is connected to the coupling unit 120 and the discharge unit 130, or connected to a vacuum portion 119 (see, e.g., FIG. 4a) which generates a negative pressure (e.g., a suction force). The vacuum portion 119 is disposed inside the stage 110 and the coupling unit 120, and may generate a suction force. For example, the vacuum portion 119 may generate suction force from itself, without an additional device. However, the suction force may be generated from outside the stage 110 by a pipe. Accordingly, the target substrate SUB may be fastened to the central support 113 by the suction force applied to the target substrate SUB through the central fastening holes CFH.

The stage 110 further includes a stage base 117 which is coupled to the conveying unit 20 and disposed above the coupling unit 120.

Referring to FIG. 4A, an upper portion of the stage base 117 is coupled to a lower portion of the peripheral support 111 in a fastening manner, and a lower portion of the stage base 117 is coupled to the conveying unit 20. Accordingly, an end portion of the conveying unit 20 is coupled between the stage base 117 and the coupling unit 120, and the stage 110 may be guided along a guide 30 by the operation of the conveying unit 20 to be transferred to a position where the laser machining is performed.

The stage base 117 has a substantially hollow shape so that the inside of the stage 110 and the inside of the coupling unit 120 may be connected with each other. The stage base 117 may have a shape corresponding to a shape of the stage 110 and may be thrilled unitarily with the peripheral support 111. However, the present invention is not limited thereto. For example, the stage base 117 may be attached to the peripheral support 111 of the stage 110.

According to an exemplary embodiment of the present invention, an upper suction unit FM may be disposed above the stage 110.

The upper suction unit FM may include at least one suction pipe SCP. Accordingly, external air may be sucked into the suction pipe SCP through upper suction holes. Thus, according to an exemplary embodiment of the present invention, when the target substrate SUB is irradiated with the laser beam LSR, the foreign matter and debris generated on the target substrate SUB may be effectively removed through the upper suction holes and the suction pipe SCP.

Although the upper suction unit FM is described in an exemplary embodiment of the present invention by way of example, foreign matter may be removed through the coupling unit 120 and the discharge unit 130 without the upper suction unit FM.

Figure 3A:
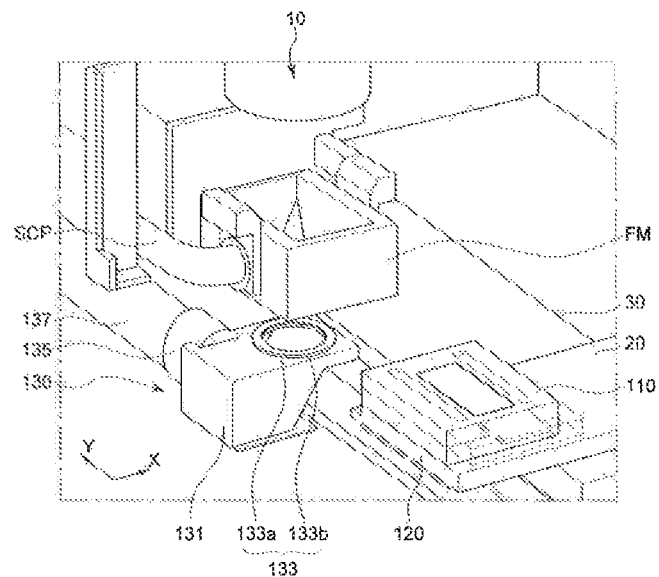
FIG. 3A is a perspective view illustrating a state before docking of a laser apparatus according to an exemplary embodiment of the present invention.
Figure 3B:
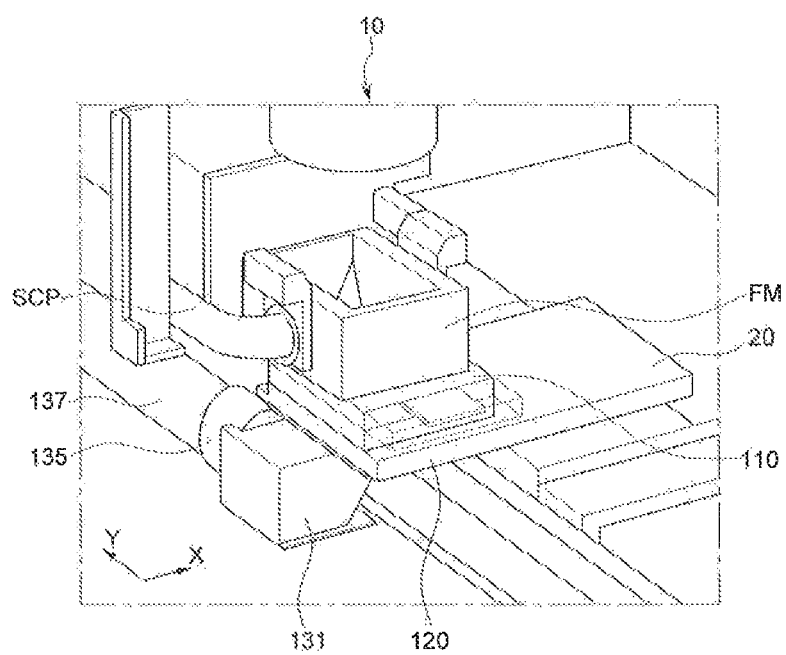
FIG. 3B is a perspective view illustrating a state after docking of a laser apparatus according to an exemplary embodiment of the present invention.
Figure 4B:
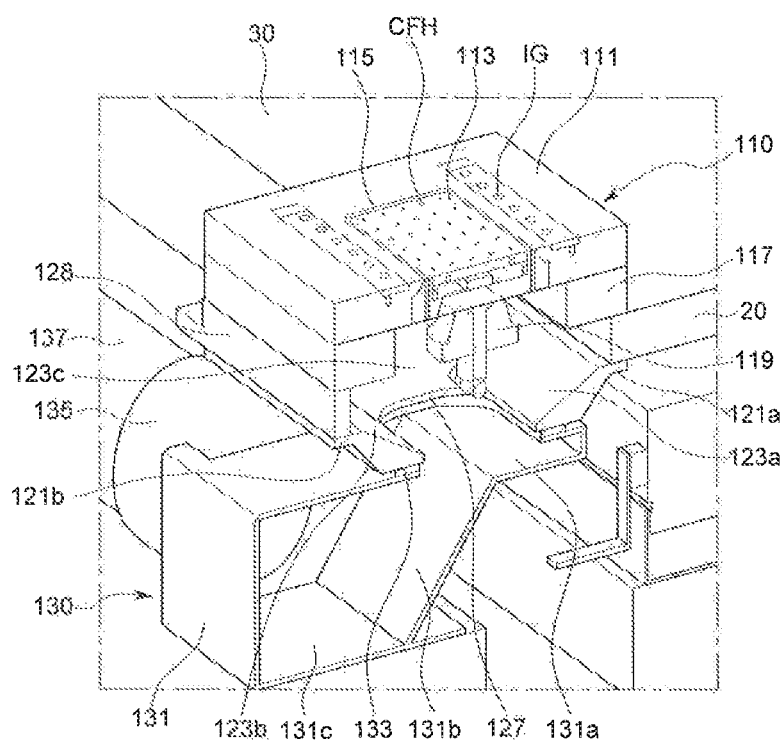
FIG. 4B is a partial cross-sectional view illustrating a state after docking of a laser apparatus according to an exemplary embodiment of the present invention.

FIG. 3A is a perspective view illustrating a state before docking of a laser apparatus according to an exemplary embodiment of the present invention, FIG. 3B is a perspective view illustrating a state after docking of a laser apparatus according to an exemplary embodiment of the present invention, FIG. 4A is a partial cross-sectional view illustrating a state before docking of a laser apparatus according to an exemplary embodiment of the present invention, and FIG. 4B is a partial cross-sectional view illustrating a state after docking of a laser apparatus according to an exemplary embodiment of the present invention.

The coupling unit 120 is disposed below the stage 110, and is connected to the conveying unit 20 which conveys the stage 110 on a plane. The coupling unit 120 may be disposed between the stage 110 and the discharge unit 130, and leads the foreign matter, including fume, which is generated during laser machining, to the discharge unit 130.

The coupling unit 120 includes a side flange (e.g., 121a and 121b), an inclined portion 123 (e.g., 123a, 123b and 123c), a coupling hole 125, and a coupling portion 127.

The side flange (e.g., 121a and 121b) may protrude from an end portion of the inclined portion 123 in a direction orthogonal to a direction in which the stage 110 is conveyed (e.g., the x-axis direction), and includes a first side flange 121a and a second side flange 121b.

The first side flange 121a is coupled to a lower portion of the conveying unit 20, extends from a first inclined portion 123a, has a shape bent from the first inclined portion 123a in the x-axis direction, and protrudes to a predetermined length from the first inclined portion 123a, For example, the first side flange 121a may form a predetermined angle with the first inclined portion 123a.

A lower portion of the first side flange 121a is placed on the guide 30 so that the first side flange 121a is guided by the guide 30 during the operation of the conveying unit 20. Accordingly, the coupling unit 120 is conveyed to a position where the laser machining is performed, together with the stage 110.

The second side flange 121b is disposed at a position opposing the first side flange 121a and has a shape corresponding to a shape of the first side flange 121a. For example, the second side flange 121b may extend in a direction opposite to that of the first side flange 121a.

A cover 128 may be disposed above the second side flange 121b.

The cover 128 is a portion extending from the conveying unit 20, and covers front, back, left, and right portions of an upper portion of the side flanges 121a and 121b. It is described that the inside of the cover 128 has a vertical shape, but the inside of the cover 128 may have an inclination corresponding to the inclination of the inclined portion 123, and may be manufactured unitarily with the inclined portion 123. For example, the cover 128 and the inclined portion 123 may be manufactured as a single body.

In addition, the stage base 117, the cover 128, and the inclined portion 123 may be formed as a single body into a flannel shape in which a cross-sectional area thereof decreases in the downward direction, to reduce flow resistance of fluid.

In addition, third and fourth side flanges connecting the first side flange 121a and the second side flange 121b may be disposed on opposite end portions of the first and second side flanges 121a and 121b in the direction of the stage 110.

The inclined portion 123 may connect the side flange (e.g., 121a and 121b) and the coupling portion 127 and may extend from the coupling portion 127. For example, the first and second inclined portions 123a and 123b may connect to the first and second side flanges 121a and 121b, respectively. In addition, the first and second inclined portions 123a and 123b may be connected to the coupling portion 127, and the first and second inclined portions 123a and 123b may extend from the coupling portion 127 to be inclined so that a cross-sectional area between the first inclined portion 123a and the second inclined portion 123b may increase in the upward direction. For example, the first and second inclined portions 123a and 123b may extend in directions away from each other.

The inclined portion 123 includes first, second, third, and fourth inclined portions 123a, 123b and 123c, and the fourth inclined portion is not illustrated.

The first inclined portion 123a extends from the coupling portion 127 to the first side flange 121a, the second inclined portion 123b extends from the coupling portion 127 to the second side flange 121b, the third inclined portion 123c extends from the coupling portion 127 to the third side flange, and the fourth inclined portion extends from the coupling portion 127 to the fourth side flange.

The inclined portion 123 may form a shape of a funnel as a whole, and thus, the flow resistance may be substantially minimized during air flow.

The coupling portion 127 may contact a suction portion 133 when the coupling unit 120 and the discharge unit 130 are docking for laser machining. For example, the coupling portion 127 and the suction portion 133 may directly contact each other.

The coupling portion 127 and the suction portion 133 contact each other to be sealed, which will be described below with reference to FIGS. 5 to 6C.

The coupling portion 127 may be a rim or an edge surrounding the coupling hole 125, and the coupling portion 127 has a shape corresponding to a shape of the suction portion 133. Although the shape of the coupling portion 127 and the suction portion 133 is circular in an exemplary embodiment of the present invention by way of example, the coupling portion 127 and the suction portion 133 may be an elliptical shape, and other shapes may be adopted for substantially minimizing flow resistance and stabilizing docking.

The conventional laser apparatus uses four pipes, each having a diameter of about 8 min, the total cross-sectional area of the pipe is about 200.96 mm$^2$, and the flow speed in the cutting line groove is about 1.5 m/s or less. As such, the conventional laser apparatus has a small cross-sectional area, and thus, clogging of the pipe may be frequently caused, which often results in a large amount of air flow being lost and inadequate suction performance in the cutting line groove occurring.

The coupling portion 127 and the suction portion 133 according to an exemplary embodiment of the present invention may have a diameter of, for example, about 100 mm or more. In addition, the laser apparatus 100 according to an exemplary embodiment of the present invention may be a single pipe line rather than a plurality of pipes. For example, the inside of the stage 110, the inside of the coupling unit 120, and the inside of the discharge unit 130 constitute one exhaust pipe line, and the coupling portion 127 and the suction portion 133 have a minimum cross-sectional area of the exhaust pipe line formed by the stage 110, the coupling unit 120, and the discharge unit 130.

When the coupling portion 127 and the suction portion 133 have a diameter of about 100 mm, the cross-sectional area thereof is about 7850 $mm^2$, and the flow speed in the cutting line groove is about 5 m/s or more.

Accordingly, as the laser apparatus according to an exemplary embodiment of the present invention has an exhaust pipe line with a cross-sectional area that is about several tens of times larger than that of the conventional one, a period of pipe clogging may decrease several hundred times or more, and an amount of suction flow in the cutting line groove may increase. Accordingly, the laser apparatus according to an exemplary embodiment of the present invention may sufficiently suck foreign matter to reduce the contamination inside the stage 110, the coupling unit 120 and the discharge unit 130, and defective products due to contamination may be reduced.

The discharge unit 130 is disposed at a predetermined position for laser machining to suck up foreign matter and communicates with the coupling unit 120 through docking with the coupling unit 120 to discharge foreign matter, including fume, which may be generated during laser machining.

The discharge unit 130 may be fastened below a position where the laser generating unit 10 is to be disposed during the laser machining to remove foreign matter during laser machining.

The discharge unit 130 includes a casing 131, a suction portion 133, a connection pipe 135, and a dust collection pipe 137.

The casing 131 may be hollow so that the foreign matter, including fume, may pass through the casing 131 to be discharged to the connection pipe 135.

The casing 131 may have a substantially quadrangular parallelepiped shape. A first side of the casing 131 may be coupled to the guide 30 in a fastening manner, and thus, the first side may have a small height, and a second side of the casing 131 may be coupled to the connection pipe 135 and have a large height. For example, the first side of the casing 131 may be smaller than the second side of the casing 131. However, exemplary embodiments of the present invention are not limited thereto, and the casing 131 may have a quadrangular parallelepiped shape having a substantially same height, and the shape is not limited thereto.

The casing 131 according to an exemplary embodiment of the present invention includes a first horizontal casing 131a connected to one side of the guide 30 which allows the coupling unit 120 to move along the guide 30, a second horizontal casing 131c connected to the connection pipe 135, and an inclined casing 131b connecting the first horizontal casing 131a and the second horizontal casing 131c to each other and having a predetermined inclination. For example, the first horizontal casing 131a may include a lower side surface, a first side surface and an upper side surface connected to the lower side surface by way of the first side surface. The second horizontal casing 131c may include a lower side surface, a second side surface opposite the first side surface and an upper side surface connected to the lower side surface by way of the second side surface. An opening may be provided between the upper side surface of the first horizontal casing 131a and the upper side surface of the second horizontal casing 131c.

The first horizontal casing 131a is lower in height than the second horizontal casing 131c, and a lower portion of the first horizontal casing 131a is coupled to the guide 30 in a fastening manner. For example, the first side surface of the first horizontal casing 131a is smaller than the second side surface of the second horizontal casing 131c.

The inclined casing 131b extends from the first horizontal casing 131a to the second horizontal casing 131c, and the suction portion 133 is disposed on the first horizontal casing 131a and the inclined casing 131b.

The connection pipe 135 is coupled to one side of the second horizontal casing 131c, and foreign matter is discharged to a dust collector through the connection pipe 135 and the dust collection pipe 137 connected to the connection pipe 135.

The dust collector is disposed outside the laser apparatus 100 to generate a suction force for sucking the foreign matter, and stores the foreign matter. For example, the dust collector may be a vacuum pump.

The suction portion 133 is disposed on the casing 131. For example, the suction portion 133 may be disposed on the first horizontal casing 131a and the inclined casing 131b.

The suction portion 133 is coupled to the coupling portion 127 to lead the foreign matter into the casing 131.

The suction portion 133 is disposed on the casing 131. The suction portion 133 includes a hollow ring portion 133a disposed at a portion to be docked with a lower portion of the coupling unit 120, and a hollow flange 133b coupled to an upper portion of the ring portion 133a, and protrudes further outward than an outer circumference of the ring portion 133a.

The ring portion 133a may include a non-flexible material, and the flange 133b may include a flexible material. For example, the flange 133b is more flexible than the ring portion 133a.

Figure 5:
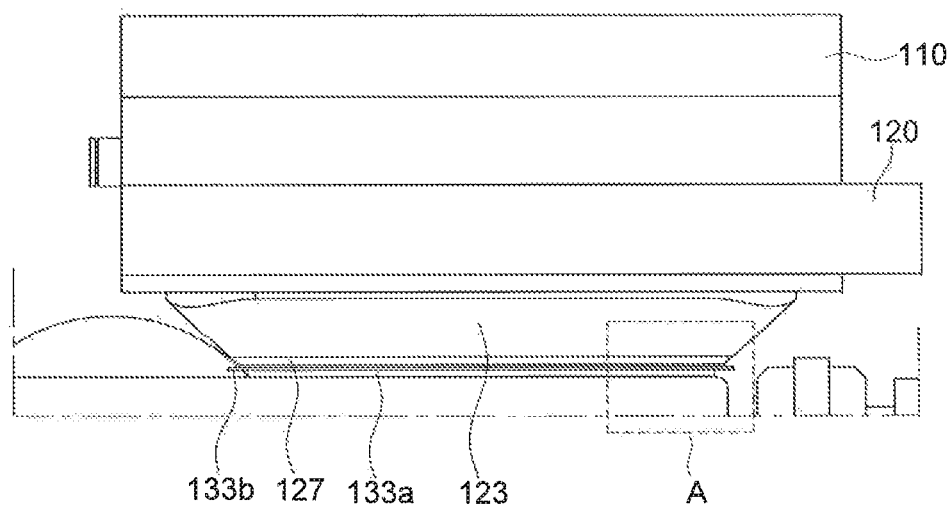
FIG. 5 is a side view illustrating a laser apparatus according to an exemplary embodiment of the present invention.
Figure 6A:
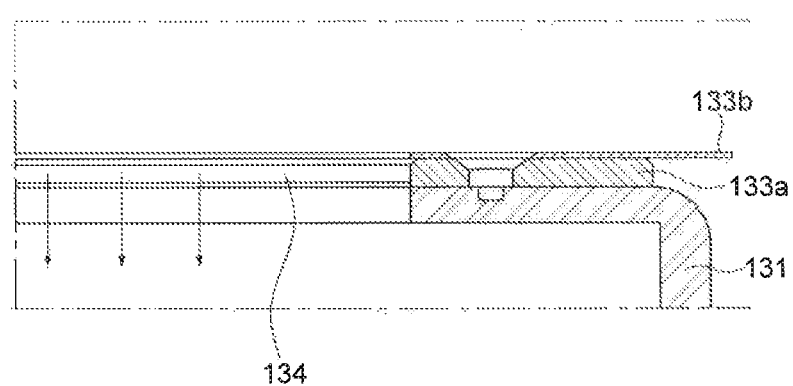
FIGS. 6A, 6B, and 6C are side views enlarging a portion A of FIG. 5, illustrating a process of close contact when the laser apparatus is docking according to an exemplary embodiment of the present invention.
Figure 6B:
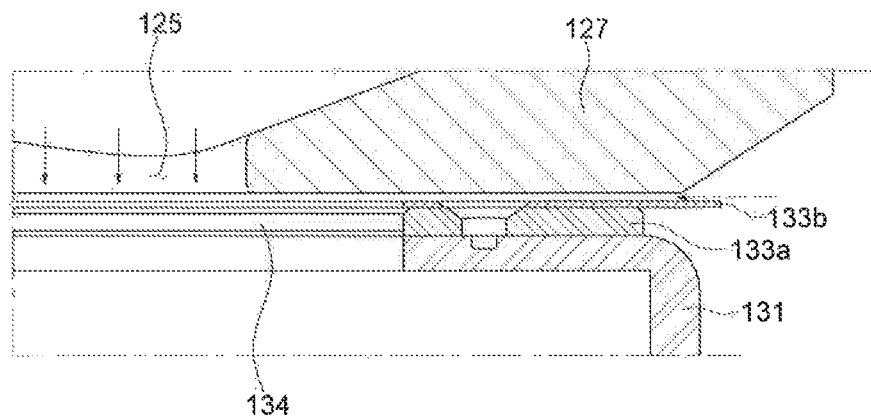
Figure 6C:
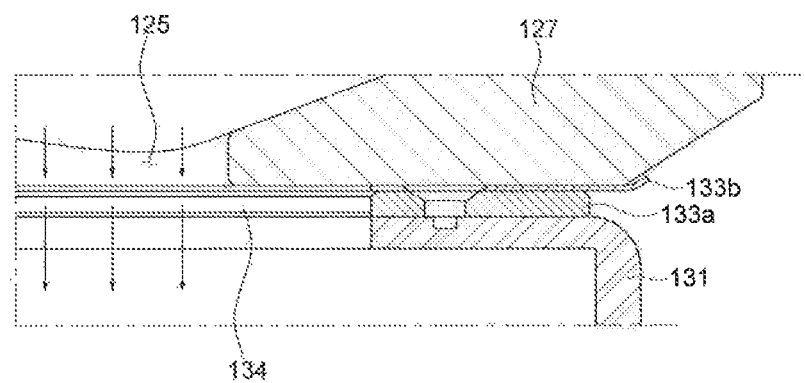

FIG. 5 is a side view illustrating a laser apparatus according to an exemplary embodiment of the present invention, and FIGS. 6A, 6B, and 6C are side views enlarging a portion A of FIG. 5, illustrating a process of close contact when the laser apparatus is docking according to an exemplary embodiment of the present invention.

The flange 133b maintains its flat shape when it is not docked with the coupling unit 120, and the flange 133b has an arc shape with an end portion raised upwardly when it is docked with the coupling unit 120.

For example, referring to FIG. 5, the discharge unit 130 is fastened to a position where the laser generating unit 10 is to be disposed during the laser machining, and the coupling unit 120 is conveyed by the conveying unit 20 to be disposed on the discharge unit 130.

The coupling portion 127 is spaced apart upwardly from the suction portion 133 by a predetermined interval so as not to collide with the suction portion 133 during horizontal movement.

In an exemplary embodiment of the present invention, the predetermined interval may be in a range from about 0.5 mm to about 1.0 mm.

Referring to FIG. 6A, the flange 133b maintains its flat shape when the coupling unit 120 is not disposed on the discharge unit 130.

Referring to FIG. 6B, the coupling unit 120 is disposed above the discharge unit 130 to start docking, and the discharge unit 130 and the coupling unit 120 are spaced apart from each other by a predetermined interval.

In an exemplary embodiment of the present invention, an outside air starts to flow into a space between the coupling portion 127 and the suction portion 133, and the speed of the outside air gradually increases due to the suction force of the dust collector, as illustrated in FIG. 6C. In such a case, an end portion of the flange is raised by a pressure difference between inside and outside of the discharge unit 130 and the coupling unit 120, and thus the flange may form an arc shape.

Accordingly, the flange 133b is rolled up to surround the coupling portion 127, and a portion where the coupling portion 127 and the suction portion 133 are connected to each other forms a closed pipe. At this time, docking of the coupling unit 120 and the discharge unit 130 is completed, and foreign matter generated during laser machining may be stably discharged to the dust collector.

When the coupling unit 120 moves again after the laser machining is finished, the flange 133b maintains its flat shape. For example, when the docking between the coupling unit 120 and the flange 133b has ended, the flange 133b may maintain its flat shape.

Although the coupling unit 120 and the discharge unit 130 are sealed by the flange 133b in an exemplary embodiment of the present invention by way of example, the flange 133b may be automatically sealed by a controller according to the process.

Figure 7:
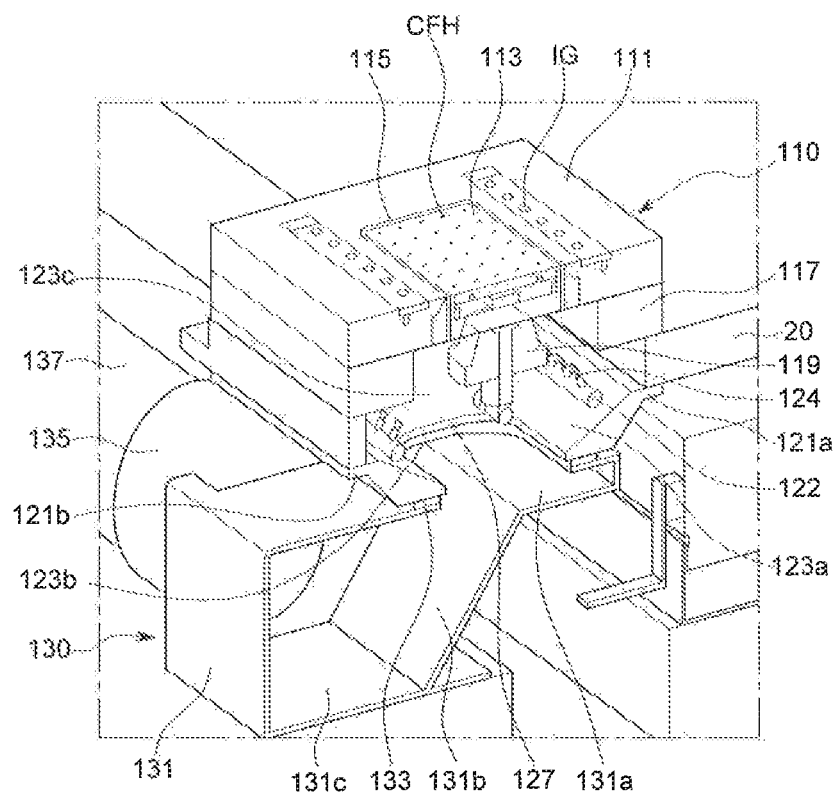
FIG. 7 is a cross-sectional view illustrating a part of a laser apparatus according to an exemplary embodiment of the present invention.
Figure 8:
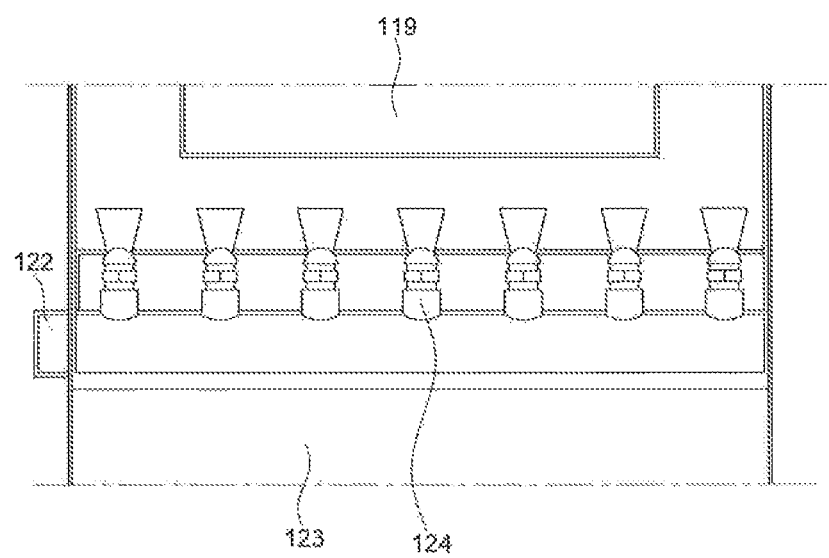
FIG. 8 is a view illustrating a nozzle of FIG. 7 according to an exemplary embodiment of the present invention.

FIG. 7 is a cross-sectional view illustrating a part of a laser apparatus according to an exemplary embodiment of the present invention, and FIG. 8 is a view illustrating a nozzle of FIG. 7 according to an exemplary embodiment of the present invention.

For convenience of explanation, differences from an exemplary embodiment of the present invention will be mainly described, and omitted parts may be parts that are similar with an exemplary embodiment of the present invention described above. In addition, the components described above may be denoted by the same reference numerals, and redundant description of the components may be omitted.

Referring to FIGS. 7 and 8, a laser apparatus 100 according to an exemplary embodiment of the present invention removes foreign matter scattered and deposited inside and/or on top of a stage 110 and inside a coupling unit 120.

An air supply pipe 122 through which air is supplied is disposed at an inclined portion 123 of the coupling unit 120 along a moving direction of the stage 110.

A plurality of nozzles 124 are disposed at the air supply pipe 122 along a longitudinal direction of the air supply pipe 122.

The air supply pipe 122 receives air through a pump and an air tank.

Although the air supply pipe 122 is fixed to the inclined portion 123 in the present exemplary embodiment of the present invention by way of example, a motor may be disposed on a side surface of the air supply pipe 122 so that the air supply pipe 122 may rotate at a preset angle.

In addition, air is used to remove foreign matter in the present exemplary embodiment of the present invention by way of example, but foreign matter may be removed by using liquid, and the present invention is not limited to air.

Each nozzle 124 is connected to the air supply pipe 122 to spray the air to inside the stage 110 and the coupling unit 120, and on a vacuum portion 119.

Each nozzle 124 may be inclined at an angle corresponding to the normal to the inclined portion 123. In addition, each nozzle 124 may be inclined at an angle greater than or less than the normal to the inclined portion 123.

As such, the foreign matter having flowed into the stage 110 and deposited therein during the laser machining may be re-scattered by the air sprayed by the plurality of nozzles 124 so that it may be sucked into a dust collector by a suction force of the dust collector.

Accordingly, the laser apparatus according to an exemplary embodiment of the present invention may extend the period of cleaning the inside of the stage and the coupling unit by removing the scattered and deposited foreign matter with air injection, and the failure of the laser apparatus due to the foreign matter may be significantly reduced.

As set forth hereinabove, the laser apparatus according to an exemplary embodiment of the present invention may sufficiently suck foreign matter to reduce contamination inside the stage, the coupling unit and the discharge unit, and may reduce defective products due to contamination.

In addition, according to an exemplary embodiment of the present invention, foreign matter deposited in scattering manner may be removed by spraying an air, and the period of cleaning the inside of the stage and the coupling unit may be lengthened, and the failure of the laser apparatus due to foreign matter may be substantially prevented.

While the present invention has been shown and described with reference to the exemplary embodiments thereof, it will be apparent to those of ordinary skill in the art that various changes in form and detail may be made thereto without departing from the spirit and scope of the present invention.

What is claimed is:

1. A laser apparatus comprising:
    a stage, wherein a target substrate is mounted on the stage;
    a coupling unit disposed below the stage and coupled with a conveying unit, the conveying unit configured to convey the stage, wherein the stage comprises a stage base disposed on a top surface of the conveying unit and including an opening, wherein the top surface of the conveying unit directly contacts a lowermost surface of the stage base, wherein the conveying unit includes an opening overlapping the opening of the stage base, wherein the opening of the conveying unit is larger than the opening of the stage base; and
    a discharge unit disposed at a predetermined position for laser machining, configured to communicate with the coupling unit when docked with the coupling unit, and configured to discharge foreign matter that is generated during laser machining.

2. The laser apparatus of claim 1, wherein the discharge unit comprises:
    a casing which is hollow to allow the foreign matter to pass therethrough;
    a suction portion disposed on the casing; and
    a connection pipe connected to a dust collection pipe at one side of the casing.

3. The laser apparatus of claim 2, wherein the casing comprises:
    a first horizontal casing connected to one side of a guide, wherein the coupling unit is configured to move along the guide;
    a second horizontal casing connected to the connection pipe; and an inclined casing connecting the first horizontal casing and the second horizontal casing, the inclined casing having a predetermined inclination.

4. The laser apparatus of claim 2, wherein the suction portion comprises:
 a ring portion disposed on the casing and configured to be docked with a lower portion of the coupling unit; and
 a flange disposed on the ring portion and protruding past an outer circumference of the ring portion.

5. The laser apparatus of claim 4, wherein the flange comprises a flexible material.

6. The laser apparatus of claim 5, wherein the flange has a flat shape when it is not docked with the coupling unit, and has an arc shape when it is docked with the coupling unit.

7. The laser apparatus of claim 1, wherein the stage comprises:
 a central support overlapping a portion of a substrate lying area, wherein the target substrate is mounted on the substrate lying area;
 a cutting line groove disposed outside of the central support and having a shape corresponding to that of a laser cutting line; and
 a plurality of inlet grooves disposed outside the cutting line groove.

8. The laser apparatus of claim 7, wherein a plurality of fastening holes is disposed in the central support, and
 each of the fastening holes overlap the substrate lying area.

9. The laser apparatus of claim 7, wherein the stage base is coupled to the conveying unit and disposed on the coupling unit.

10. The laser apparatus of claim 8, wherein the stage further comprises a vacuum portion configured to provide suction through each of the fastening holes.

11. The laser apparatus of claim 7, wherein the cutting line groove and each of the inlet grooves are configured to receive, during the laser machining, the foreign matter and to move the foreign matter to the coupling unit.

12. The laser apparatus of claim 2, wherein the coupling unit comprises:
 a coupling portion having a shape corresponding to a shape of the suction portion;
 an inclined portion extending from the coupling portion, wherein inclined sidewalls of the inclined portion extend away from each other in an upward direction; and
 a side flange protruding from an end portion of the inclined portion in a direction orthogonal to a direction in which the stage is conveyed.

13. The laser apparatus of claim 12, wherein a diameter of each of the coupling portion and the suction portion is about 100 mm or more.

14. A laser apparatus comprising:
 a stage, wherein a target substrate is mounted on the stage and is configured to receive a laser beam emitted from a laser generator, wherein the stage includes a cutting line groove including a polygonal shape, from a plan view, that corresponds to that of a laser cutting line;
 a coupling unit disposed below the stage and configured to remove foreign matter; and
 a discharge unit disposed at a predetermined position for laser machining and configured to communicate with the coupling unit through docking with the coupling unit to discharge the foreign matter,
 wherein the discharge unit includes:
  a casing which is hollow; and
  a connection pipe connected to a dust collection pipe and to a first flat sidewall of the casing, wherein a top surface of the casing is wider than a bottom surface of the casing, and the first flat sidewall connects the top surface of the casing to the bottom surface of the casing.

15. The laser apparatus of claim 14, wherein the discharge unit comprises:
 a suction portion disposed on the casing.

16. The laser apparatus of claim 15; wherein the coupling unit comprises:
 a coupling portion having a shape corresponding to a shape of the suction portion; and
 an inclined portion connected to the coupling portion.

17. The laser apparatus of claim 16, wherein the inclined portion comprises:
 an air supply pipe configured to supply air; and
 a nozzle connected to the air supply pipe to spray air.

18. The laser apparatus of claim 17, wherein the nozzle is inclined at an angle corresponding to a normal to the inclined portion.

19. The laser apparatus of claim 17, wherein the air supply pipe is configured to rotate.

20. The laser apparatus of claim 16, wherein a diameter of each of the coupling portion and the suction portion is about 100 mm or more.

21. The laser apparatus of claim 1, wherein the stage further comprises a vacuum portion provided in the opening of the stage base and configured to provide suction.

* * * * *